United States Patent [19]

Pillai

[11] Patent Number: 5,731,358
[45] Date of Patent: Mar. 24, 1998

[54] PROCESS FOR THE MANUFACTURE OF HIGH GRADE DEVULCANIZED RUBBERS FROM SCRAP AND REJECT RUBBER ITEMS

[76] Inventor: Chandrasekaran Ramayya Pillai, 90 Jalao Terasek, Bangsar Baru, 59100 Kuala Lumpur, Malaysia

[21] Appl. No.: 692,628

[22] Filed: Aug. 6, 1996

Related U.S. Application Data

[60] Provisional application No. 60/002,006, Aug. 7, 1995.

[51] Int. Cl.$^6$ ............................ C08J 11/00; C08L 17/00
[52] U.S. Cl. .................... 521/41; 521/40.5; 521/42; 521/42.5; 521/45; 521/45.5; 521/502; 525/232; 525/240; 528/931
[58] Field of Search ..................... 521/41, 40.5, 42, 521/42.5, 45, 45.5, 502; 525/232, 240; 528/931

[56] References Cited

U.S. PATENT DOCUMENTS

| | | | |
|---|---|---|---|
| 4,341,667 | 7/1982 | Lal et al. | 521/41 |
| 4,386,182 | 5/1983 | Zijp | 521/41 |
| 5,157,082 | 10/1992 | Johnson | 525/232 |

OTHER PUBLICATIONS

Article "Expoxidized Natural Rubber" I.R. Gelling, pp. 184–188, Exhibit 1.
Article "Epoxidized Rubber (ENR)", Dr. C. Mitherell, p. 1, Exhibit 2.
Article "Methods of Devulcanization", Walter C. Warner, pp. 559–566, Exhibit 3.
Article "Scrap Tire and Rubber Recycling Terminology", pp. 3, 6, 7, 10, 11, 18–21, 24–25, Exh. 4.
Article "Reclaimed Rubber", Fernley G. Smith, pp. 318–335, Exhibit 5.
Article "Thermoplastic Elastomers–Three Decades of Progress", N. R. Legg Exhibit 6.
Article "Vulcanization: Conventional and Dynamic", Hubert Y. Coran. Exh. 7.
Article "Charles Goodyear Medalist—1995", Biography, R. Warren Wise Exh. 8.
Article "Thermoplastic Copolyesters" R.P. Kane Exh. 9.
Article "Thermoplastic Elastomers" B.Ø Simpson. Exh. 10.

Primary Examiner—Vasu Jagannathan
Assistant Examiner—Olga Asinovsky
Attorney, Agent, or Firm—Peter A. Borsari

[57] ABSTRACT

A process for the manufacture of devulcanized rubbers from a base material composed of scrap rubber products is provided which produces high grade, low viscosity rubber products. The process is carried out in at least two stages, the first stage comprising mixing a polymeric additive to the base material at elevated temperatures and the second stage comprising mixing unvulcanized virgin rubber with the mixture of base material and polymeric additive at elevated temperatures. The process also may comprise a preliminary stage in which a chemically modified epoxidized natural rubber is mixed with the base material at ambient temperature prior to the first stage.

17 Claims, No Drawings

PROCESS FOR THE MANUFACTURE OF HIGH GRADE DEVULCANIZED RUBBERS FROM SCRAP AND REJECT RUBBER ITEMS

RELATED APPLICATION

The present application claims the benefit of U.S. Provisional Application 60/002,006, filed Aug. 7, 1995.

FIELD OF INVENTION

The present invention relates to a process for the manufacture of high grade devulcanized rubbers from vulcanized scraps and reject rubber products. More particularly, the present invention relates to a process for reclaiming vulcanized natural and synthetic rubbers in at least two stages wherein a polymeric additive is added to the vulcanized scrap rubber in a first stage and unvulcanized virgin rubber is added to the resulting mix in a second stage. The process also may comprises a preliminary stage wherein the scrap rubber is initially mixed with a chemically modified epoxidized rubber.

BACKGROUND OF THE INVENTION

The process of vulcanisation which converts rubber from its plastic state to its elastic state was discovered by Charles Goodyear in 1839. This exceptional discovery has led to the growth of an international rubber industry ranging from rubber plantations to extensive manufacturing operations, including the production of synthetic rubbers. Synthetic rubbers initially were produced as a substitute for natural rubber and later for specialized applications. Today, annual rubber production and consumption of both synthetic rubbers and natural rubbers is in excess 20 million tons, about 35% of this amount being in the form of natural rubber.

This massive volume of rubber production gives rise to substantial amounts of scraps and rejects including latex products such as gloves, condoms, threads, catheters, finger cots and the like, as well as used tires, the latter being a large percentage of the total scrap rubber discarded each year. The enormous quantity of used robber products has created a serious disposal problem, particularly in the United States where in excess of 250 million tires are discarded annually. Due to environmental pressures and the decreasing availability of landfills, demand for recycling scrap and reject rubber products has grown substantially.

Reclaiming of scrap rubber to its original plastic state from its vulcanised elastic state enables the rubber to be recycled for use in new rubber articles. However, most attempts to recycle reclaimed rubber have resulted in only a minor proportion of the reclaimed rubber being used in blends with virgin rubbers. Moreover, the properties of reclaimed rubber are effected by the presence of large amounts of mineral fillers and aromatic oils which are an essential part of the conventional rubber reclaiming process. As a result, automobile tire manufacture is one area where reclaimed rubber typically is not used. Further, a majority of the reclaim rubbers generally available contain about some 5% oil and higher levers of conventional fillers including calcium carbonate and carbon black. These reclaim rubbers are not always desirable to manufacturers due to the level of "contaminants".

Despite the development of rubber reclamation, a need still exists for a new rubber reclamation process which reduces costs and improves the quality of reclaimed rubber. Such a process should produce more consistent reclaimed rubber and should enable the manufacturer to control the viscosity of the devulcanized rubber. Further, such a process should obviate the use of undesirable contaminants such as oils and peptisers. In addition, a need still exists for a process capable of producing a high grade rubber polymer that does not contain any fillers such as calcium carbonate.

SUMMARY OF THE INVENTION

Accordingly, it is an object of the present invention to provide a process for the manufacture of devulcanized rubbers from scrap and rubber reject items which produces high quality, high grade rubbers.

It also is an object of the present invention to provide a process for the manufacture of high grade devulcanized rubbers from scrap and rubber reject items which reduces the manufacturing costs.

It is a further object of the present invention to provide a process for the manufacture of high grade devulcanized rubbers from scrap and rubber reject items which produces a higher yield of high quality, re-usable reclaimed rubber.

It is an additional object of the present invention to provide a process for the manufacture of high grade devulcanized rubbers from scrap and rubber reject items which enables the manufacturer to control the viscosity of the devulcanized rubber.

It is another object of the present invention to provide a process for the manufacture of high grade devulcanized rubbers from scrap rubbers which does not use undesirable contaminants such as oils and peptisers.

It is yet another object of the present invention to provide a process for the manufacture of high grade devulcanized rubber which produces a 98% grade polymer that does not contain any fillers such as calcium carbonate and carbon black.

Additional objects, advantages and novel features of the invention will be set forth in part of the description which follows, and in part will become apparent to those skilled in the art upon examination of the following specification or may be learned by practice of the invention.

These objects are achieved by providing a process for the production of high grade devulcanized rubber comprising at least two stages: a first stage comprising adding to a base material consisting of scrap rubber products a polymeric additive in pre-determined amounts, blending the polymeric additive with the base material at specific temperature ranges for a selected period of time and cooling the resulting blend, and a second stage comprising adding to the cooled blend a quantity of unvulcanized virgin rubber. In a preferred embodiment, the process of the present invention further comprises a preliminary stage wherein a chemically modified epoxidized natural rubber first is mixed with the base material.

DETAILED DESCRIPTION

The present invention relates to a process for the production of high grade devulcanized rubber from vulcanized rubber scrap material comprising at least two distinct stages. In each stage, the vulcanized rubber scrap material is mixed with an additive at established temperatures and specific periods of time. Temperature and time is dependent upon the type of scrap rubber used, the type of additive and the level of viscosity desired in the final reclaim product.

Included among the types of vulcanized rubber scrap materials contemplated by the present invention are those derived from natural rubber, chloroprene, nitrile, styrene-butadiene rubber, polybutadiene, EPDM. However, it is to be understood that these types of rubbers are meant to be illustrative only and that scrap rubbers derived from other types of rubber may be used in the instant invention.

In the first stage, a base material is formed from vulcanized scrap rubber products. In order to ensure a homogenous blend, the vulcanized scrap rubber products first are milled or ground, for example into pellet or powder form. To the base material is added from about 0.5 to about 5.0%/wt., preferably from about 1.0 to about 2.0%/wt. (based on the weight of the base material) a first additive selected from the group consisting of polyethylene, polypropylene and blends thereof (hereinafter sometimes referred to as the polymeric additive). The polymeric additive is provided in pellet or powder form by techniques well known in the art. Preferably, the polymeric additive is a blend of about 30 to 70 parts polyethylene with about 70 to 30 parts polypropylene. More preferably, the blend is composed of about 70 parts polyethylene and 30 parts polypropylene. The resulting blend of base material and polymeric additive is mixed at a temperature in the range of about 80° to about 220° C. for about 0.5 to about 15.0 minutes. In order to achieve optimum results, the amount of the first additive added to the blend and the mixing temperature is dependent upon the type of vulcanized scrap rubber used to form the base material as shown in the following table:

Dosage and Temperature Range of Polymeric Additive

| Scrap Rubber | Dosage %/wt. | Temperature °C. |
| --- | --- | --- |
| Natural Rubber | 2.0 | 150.0–185.0 |
| Chloroprene | 2.0 | 80.0–100.0 |
| Nitrile | 1.0 | 90.0–170.0 |
| SBR | 1.0 | 150.0–220.0 |
| Polybutadiene | 1.0 | 150.0–220.0 |
| EPDM | 1.0 | 170.0–220.0 |

In the first stage, from about 1.0 to 5.0%/wt. (based on the weight of the base material) of the polymeric additive is blended with the base material and mixed in a continuous rubber mixer or a suitable high speed Banbury with temperature controls to maintain it between about 80° and 220° C. Mixing continues for a period of from about 0.5 minute to about 15 minutes, preferably from about 2 to about 5 minutes during which heat is generated due to friction. The temperature range for mixing during this first stage is dependent upon the type of polymeric additive, as shown below:

| Polymeric Additive | Temperature Range |
| --- | --- |
| 100% Polyethylene (PE) | 120 to 170° C. |
| 100% Polypropylene (PP) | 185 to 220° C. |
| 70% PE/30% PP | 170 to 185° C. |

After the blend of base material and polymeric additive has been mixed for a sufficient period of time, the resulting blended mixture is transferred to a heat preserving receptacle, such as a metal container. Preferably, the metal container is perforated to allow air to pass therethrough during the cooling process. More preferably, the blended mixture is transferred to conveniently sized metal boxes having a depth of 8 to 12 inches and having a perforated base plate. The processed mixture is left retaining (preserving) the heat for between one minute and one hour depending upon the viscosity desired of the final reclaim. After this period, the mixture is cooled by blowing air therethrough.

In the second stage, the cooled mixture is mixed with from about 0.0 to about 80.0%/wt., preferably from about 1.0 to about 50.0%/wt. and more preferably from about 5.0 to about 30.0%/wt. (based on the weight of the mixture) of a virgin rubber of the same type as the original scrap rubber on a two roll mill at temperature not exceeding 50° C. The amount of virgin rubber to be mixed is dependent upon the intended final use of the reclaim. The duration of the mixing may range from about five minutes to about fifteen minutes depending upon the desired viscosity of the reclaimed product, but should be for a time sufficient to form a homogenous low viscosity rubber. The resulting rubber is cooled and may be pressed into bales and crated for transportation.

In an alternate and preferred embodiment, the process includes a preliminary stage in which from about 0.1 to about 20.0%/wt., preferably 0.25 to about 15%/wt., (based on the weight of the base material) of a chemically modified epoxidized natural rubber (hereinafter referred to as the preliminary additive) is added to the base material. The base material and preliminary additive is mixed at a temperature not exceeding 60° C. for about five minutes to form a base mix. The base mix then is transferred to the first stage for mixing with the polymeric additive. The amount or dosage of the preliminary additive is dependent upon the type of scrap rubber product and the level of fillers (such as carbon black in the case of scrap rubber from discarded tires), as shown in the following table:

| Type of Scrap Rubber | Preliminary Additive Dosage PHR* |
| --- | --- |
| Natural Rubber | 0.25–2.50 |
| Chloroprene | 5.00–15.00 |
| Nitrile | 5.00–15.00 |
| SBR | 5.00–15.00 |
| Polybutadiene | 5.00–15.00 |
| EPDM | 5.00–15.00 |

In a second alternative embodiment, following the preliminary stage, the base mix is heated for a period of about 1 to about 5 minutes, preferably from about 2 to about 3 minutes at a temperature not exceeding 200° C. for natural rubber scrap materials and about 200° C. for scrap rubber derived from synthetic rubbers. The base mix is heated by any conventional means well known in the art. Preferably, the base mix is heated in a microwave oven. The heated base mix is transferred immediately to an internal mixer without allowing it to cool and blended with the polymeric additive as discussed above to form a homogenous blend. The resulting blend is cooled, for example on a conveyor or in perforated receptacles (such as metal boxes with perforated base plates) by blowing air therethrough. Once cooled, the mixture is transferred to the second stage of the process. This second alternative embodiment eliminates the time required for heat retention in the first stage.

The following example is provided merely to illustrate the present invention, and it is to be understood the invention is not limited thereto. All amounts of the various ingredients in the examples and elsewhere in the specification are by weight unless otherwise specified.

EXAMPLE

Devulcanized Rubber from Reclaimed Scrap Rubber

A high grade devulcanized rubber was produced from 5 parts scrap rubber and 1 part virgin rubber using the process of the present invention.

Base material: 30 kg of scrap rubber derived from rubber gloves were milled into thin sheets on a two roll mill with 0 to 1 NIP settig to form these material.

Preliminary Stage: To 30 kg of the base material, 2.5%/wt. (based on the weight of the base material) of a chemically modified epoxidized natural rubber was added and mixed using a Two Roll Mill at a temperature of 60° C. for about five minutes to form a Base Mix. The base mix was transferred to a Banbury blender for first stage processing.

First Stage: 2%/wt. (based on the weight of the base material) of polypropylene as the polymeric additive was added to the Base Mix and mixed at a temperature of 185° C. for about 10 minutes in a Banbury blender to form a blended mixture. The resulting mixture was transferred to metal boxes having perforated base plates to allow air to pass therethrough for about 3 minutes and then was cooled to a temperature of about 70° C.

Second Stage: The blended mixture was transferred to a Two Roll Mill to which 6 kg. of virgin rubber SMR-CV was added and mixed on a two roll mill at a temperature of 50° C. for a period of 5 minutes until a homogenous mixture was formed. The resulting rubber had a Mooney viscosity (MI (1+4) at 100° C. of 55. The resulting mixture was pressed into 33 kg bales and crated.

When the scrap rubber products are derived from natural rubber products containing minimal or no fillers, oils and other contaminants, the process of the present invention is capable of producing a devulcanized rubber consisting of 98% polymer of high grade and having properties similar to normal grades of rubber. In particular, the present process can produce a reclaim rubber which can be used by itself as base polymer for manufacturing many articles. This achievement is noteworthy as most reclaim rubbers have to be blended with up to 80 to 90% of other grades of rubber, except in the case of low value products like car and floor mats. The reclamation of vulcanized natural rubber may be carried out by the partial devulcanization of cross linked rubbers without any fillers, including for example, rubber gloves, catheters, condoms, finger cots and similar natural rubber based products.

When the base material is derived from vulcanized natural rubber containing minimal or no fillers, oils or contaminants, the blended mixture resulting from the first stage simply may be cooled, baled and transported without the addition of virgin natural rubber in a second stage. Alternatively, from about 20 to about 80%/wt. (based on the weight of the blended mixture) may be added to the blended mixture in the second stage depending upon the desired strength and hardness of the final product.

The process of the present invention produces a high grade, low viscosity rubber which exhibits good dimensional stability. In tests conducted by leading tire retreaders, the rubber produced by the present process has properties equal to or superior than normal grades of natural rubber required for tire tread application. Similar testing has shown that the rubber produced by the present invention has superior properties in their footwear sole formulations. Subsequent tests in various product formulations have confirmed that the devulcanized high grade rubber or the instant invention to be as good as other standard grades of rubbers. The products tested included sponge for insoles in shoes, solid tire, carpet underlay, rubber rose, slippers and car mat, flaps and tire tread.

The rubber of the present invention also exhibits lower die swell characteristics which are desirable in extruded articles processing. Moreover, unlike the Superior Processing (SP) Rubber which is commonly used to reduce compound die swell, the present rubber is about 40% cheaper than the SP grades.

While particular embodiments of the invention have been described, it will be understood, of course, that the invention is not limited thereto, and that many obvious modifications and variations can be made, and that such modifications and variations are intended to fall within the scope of the appended claims.

What is claimed is:

1. A process for the manufacture of devulcanized rubber comprising:

forming a base material composed of scrap rubber products;

a first stage comprising the steps of:
   (a) adding to said base material from about 0.5 to about 5.0%/wt., based on the weight of the base material, of a polymeric additive selected from the group consisting of polyethylene, polypropylene and mixtures thereof;
   (b) mixing said base material and polymeric additive at a temperature in the range of from about 80° to about 220° C. for a period of from about 0.5 minute to about 15 minutes to form a blended mixture; and
   (c) transferring said blended mixture to a heat preserving receptacle for about 1 to about 60 minutes and subsequently cooling said mixture; and a second stage comprising the steps of:
   (a) adding to said resulting cooled mixture from about 0.1 to about 80%/wt., based on the weight of the blended mixture, of an unvulcanized virgin rubber;
   (b) blending said cooled mixture and said unvulcanized rubber at a temperature below about 50° C. for from about 5 to about 15 minutes to form a high grade, low viscosity rubber; and
   (c) cooling said high grade, low viscosity rubber.

2. The process in accordance with claim 1, wherein said polymeric additive is polyethylene and said temperature is in the range of about 120° to about 170° C.

3. The process in accordance with claim 1, wherein said polymeric additive is polypropylene and said temperature is in the range of about 185° to about 220° C.

4. The process in accordance with claim 1, wherein said polymer is a blend of polyethylene and polypropylene and said temperature is in the range of about 150° to about 220° C.

5. The process in accordance with claim 4, wherein said temperature is in the range of about 170° to about 185° C.

6. The process in accordance with claim 4, wherein said blend is from about 30 to about 70 parts polyethylene and about 70 to about 30 parts polypropylene.

7. The process in accordance with claim 6, wherein said blend is about 70 parts polyethylene and about 30 parts polypropylene.

8. The process in accordance with claim 1, wherein said scrap rubber products are derived from natural rubber, chloroprene, nitrile, styrene-butadiene rubber, polybutadiene, EPDM and mixtures thereof.

9. The process in accordance with claim 1 further comprising a preliminary stage comprising the steps of:
   (a) adding to said base material from about 0.05 to about 20.0%/wt. based on the weight of the base material a preliminary additive which is a epoxidized natural rubber;
   (b) mixing said base material and said epoxidized natural rubber at a temperature not exceeding about 60° C. for a period of about five minutes to form a modified base material; and (c) transferring said modified base material to said first stage for mixing with said polymeric additive.

10. The process in accordance with claim 9, wherein said scrap rubber products are derived from chloroprene, nitrile, styrene-butadiene rubber, polybutadiene, EPDM and mixtures thereof.

11. The process in accordance with claim 10, wherein said preliminary additive is added in an amount from about 5.0 to about 15.0%/wt.

12. The process in accordance with claim 10, wherein said preliminary additive is added in an amount from about 0.25 to about 2.50%/wt. when said scrap rubber products are derived from natural rubber.

13. The process in accordance with claim 1, wherein from about 5.0 to about 30.0%/wt. of said unvulcanized virgin rubber is added to said resulting cooled mixture.

14. The process in accordance with claim 9, wherein from about 5.0 to about 30.0%/wt. of said unvulcanized virgin rubber is added to said resulting cooled mixture.

15. The process in accordance with claim 1, wherein said scrap rubber products are derived from vulcanized natural rubber containing no fillers or oils.

16. The process in accordance with claim 9, wherein said scrap rubber products are derived from vulcanized natural rubber containing no fillers or oils.

17. A three stage process for the manufacture of devulcanized rubber comprising forming a base material composed of scrap rubber products (a) a preliminary stage comprising the steps of:
 (1) adding to said base material from about 0.05 to about 20.0%/wt. based on the weight of the base material a preliminary additive which is a epoxidized natural rubber;
 (2) mixing said base material and said epoxidized natural rubber at a temperature not exceeding about 60° C. for a period of about five minutes to form a modified base material; and
 (3) transferring said modified base material for first stage processing;

(b) a first stage comprising the steps of:
 (1) adding to said base material from about 0.5 to about 5.0%/wt., based on the weight of the base material, of a polymeric additive selected from the group consisting of polyethylene, polypropylene and mixtures thereof;
 (2) mixing said base material and polymeric additive at a temperature in the range of from about 80° to about 220° C. for a period of from about 0.5 minute to about 15 minutes to form a blended mixture; and
 (3) transferring said blended mixture to a heat preserving receptacle for about 1 to about 60 minutes and subsequently cooling said mixture; and (c) a second stage comprising the steps of:
 (1) adding to said resulting cooled mixture from about 0.1 to about 80%/wt., based on the weight of the blended mixture, of an unvulcanized virgin rubber;
 (2) blending said cooled mixture and said unvulcanized rubber at a temperature below about 50° C. for from about 5 to about 15 minutes to form a high grade, low viscosity rubber; and
 (3) cooling said high grade, low viscosity rubber.

* * * * *